(12) United States Patent
Boland

(10) Patent No.: US 7,873,074 B1
(45) Date of Patent: Jan. 18, 2011

(54) ADAPTIVE SELECTION OF BANDWIDTH PARAMETERS TO MEET A SERVICE PROVIDER PRICING MODEL

(75) Inventor: Simon Boland, Pennant Hills (AU)

(73) Assignee: Avaya Inc., Basking Ridge, NJ (US)

( * ) Notice: Subject to any disclaimer, the term of this patent is extended or adjusted under 35 U.S.C. 154(b) by 769 days.

(21) Appl. No.: 11/446,061

(22) Filed: Jun. 1, 2006

(51) Int. Cl.
*H04J 3/16* (2006.01)
*H04J 3/22* (2006.01)

(52) U.S. Cl. .................................................. 370/468
(58) Field of Classification Search ................ 370/230, 370/233, 234, 235, 252, 468
See application file for complete search history.

(56) References Cited

U.S. PATENT DOCUMENTS

| | | | |
|---|---|---|---|
| 6,028,840 A * | 2/2000 | Worster | 370/230 |
| 6,542,593 B1 | 4/2003 | Bowman-Amuah | |
| 6,757,277 B1 * | 6/2004 | Shaffer et al. | 370/356 |
| 6,775,267 B1 | 8/2004 | Kung et al. | |
| 7,257,640 B1 * | 8/2007 | Callocchia et al. | 709/233 |
| 7,412,514 B2 * | 8/2008 | Shuster | 709/226 |
| 2002/0064149 A1 | 5/2002 | Elliott et al. | |
| 2003/0067903 A1 | 4/2003 | Jorgensen | |
| 2004/0002864 A1 * | 1/2004 | Yeom | 704/270.1 |
| 2005/0235308 A1 * | 10/2005 | Dellow et al. | 725/25 |
| 2006/0053459 A1 | 3/2006 | Simerly et al. | |
| 2007/0002743 A1 * | 1/2007 | Fan | 370/235 |
| 2007/0064604 A1 * | 3/2007 | Chen et al. | 370/230 |
| 2007/0121525 A1 * | 5/2007 | Jenster | 370/252 |
| 2007/0133603 A1 * | 6/2007 | Weaver et al. | 370/468 |
| 2008/0275984 A1 * | 11/2008 | Ullmann et al. | 709/224 |
| 2009/0031384 A1 * | 1/2009 | Brooks et al. | 725/127 |
| 2009/0070454 A1 * | 3/2009 | McKinnon et al. | 709/224 |

FOREIGN PATENT DOCUMENTS

WO 0150278 7/2001

OTHER PUBLICATIONS

"Exclusive Bandwidth Saver" available at http://www.vonage.com/features.php?feature=bandwidth_saver, site updated Jul. 9, 2006, 1 page.
Wang et al. "Comparative study of two congestion pricing schemes: auction and tatonnoment", Computer Networks: The International Journal of Computer and Telecommunications Networking archive, vol. 46, Issue 1, Sep. 2004, pp. 111-131.
Heim, "Price-based Network Flow Control", available at http://www.cubinlab.ee.mu.oz.au/~dheim/web/Dominik/Thesis%20Dominik%20Heim.pdf, Day of the filing: Aug. 9, 2004, 135 pages.

* cited by examiner

*Primary Examiner*—Chi H Pham
*Assistant Examiner*—Farah Faroul
(74) *Attorney, Agent, or Firm*—Sheridan Ross P.C.

(57) ABSTRACT

The present invention provides methods and systems for managing bandwidth use in a VoIP network. More specifically, a user or enterprise may monitor the amount of voice bandwidth that is utilized throughout a period along with the total amount of bandwidth utilization. Based on a determined likelihood of exceeding a predetermined bandwidth allocation for a given period, the amount of voice bandwidth utilized on a per call basis is adjusted.

19 Claims, 6 Drawing Sheets

ADAPTIVE SELECTION OF BANDWIDTH PARAMETERS TO MEET A SERVICE PROVIDER PRICING MODEL

FIELD OF THE INVENTION

The invention relates generally to communication systems. More particularly, the invention relates to adaptive Voice over Internet Protocol (VoIP) systems.

BACKGROUND

Internet traffic volume has been increasing at an exponential rate over the past few years. So far, capacity provisioning and developments in traffic management have sustained this increased network activity. However, network congestion has become more prevalent resulting in a general deterioration of the quality of service provided by Internet service providers (ISPs). To mitigate this decrease in service there have been suggestions to share network bandwidth in a more controlled manner. In other words, there have been suggestions to alter the pricing structure for Internet services. More particularly, there have been proposals for a number of pricing models that require an Internet customer to pay for a predetermined amount of bandwidth per billing cycle.

The flat rate that a customer pays per billing cycle entitles the customer to use up to the predetermined amount of bandwidth. Once the customer has exhausted their allocated bandwidth for the billing cycle a couple of options are available. One, the customer may be charged a premium for additional bandwidth usage beyond the pre-allocated bandwidth. Two, the ISP may reduce the quality of service available to the customer for the remainder of the billing cycle. The ISP can typically reduce the quality of service for a customer by decreasing the customer's download/upload speed. Three, the customer may not be allowed any more access to the Internet for the rest of the billing cycle.

The second and third options described above may not be tolerable to a company or customer that requires use of the Internet at a particular connection speed. Indeed, many companies today rely on a properly functioning Internet to conduct day-to-day business. Without the Internet or with a reduced connection speed, many companies would experience severe losses due to decreases in efficiency. Therefore, the first option seems to be the most prevalent and desirable to the ISP and customer alike. In the third option, the ISP is able to receive a premium on additional bandwidth utilization and the customer is able to conduct business as usual.

In fact, pricing models that allocate a predetermined amount of bandwidth for a billing cycle and charge a premium for use over the allocated bandwidth have been instituted in several countries already. For example, an ISP in Australia offers a plan that allows a customer to use up to 600 MB per month for a flat fee of $29.99 per month. If the customer uses their quota of bandwidth before the end of the month, the customer may continue to use bandwidth at an additional charge of $0.15/MB. For an allocation of 50 GB per month a customer has to pay a flat fee of $89.99 per month. When the customer exceeds their quota of bandwidth before the end of the month, the customer will still pay $0.15/MB for additional bandwidth utilization.

A customer may utilize bandwidth in a number of ways. For example, data transfers (uploads and/or downloads) require use of network bandwidth. Typically, data uploads from a customer are not counted against a customer's use of bandwidth. However, certain pricing schemes may be envisioned in which the amount of bandwidth allocated to a customer includes both uploads and downloads of data. Additionally, bandwidth may be used during a VoIP call. The VoIP call requires the packetization and transmission of voice data, which necessitates use of bandwidth.

Various protocols are used to compress and packetize voice data for transmission across a packet-switched network. The device or program that is capable of performing the above-described compression/decompression and encoding/decoding steps is known as a codec. Codecs are able to put the stream or signal into an encoded form, often for transmission across a packet-switched network.

Codecs are generally used in telecommunications, video communications, and other streaming media applications. In a video communication environment, a video codec converts analog video signals from a video camera to digital signals for transmission over digital circuits. A corresponding codec on the receiving end then converts a digital signal back to an analog signal for display. In an audio communication environment, an audio codec converts an analog audio signal to a digital signal for transmission over a digital circuit. A corresponding codec on the receiving end then converts the digital signals back to analog signals for reproduction. Codecs may also be used in both cases to further compress the signal for transmission.

Codec algorithms may be implemented entirely in software, in which case a server, communication device, or the like, does all of the processing or this may also be done in hardware/firmware for faster processing. As audio and video signal processing techniques have developed, so too have the codec algorithms used to transmit audio and video signals. The result is that many different codecs exist and each of these codecs has unique operating parameters that affect the amount of bandwidth required to transmit packets of information.

One example of these codecs is the G.711 codec which samples at 8 kHz and is a standard to represent typically an 8 bit sample. The G.711 codec has a voice payload size of 160 bytes per packet corresponding to a packet size of 20 milliseconds. On the other hand, the G.729 codec operates at 8 kbit/s, samples at 8 kHz and uses a voice payload size of 20 bytes per packet corresponding to a packet size of 20 milliseconds. Many other types of codecs exist, each of which may require a different amount of bandwidth for a voice payload. Generally, a higher quality codec (i.e., a codec that creates a higher quality of sound as perceived by the listener) like G.711 or G.722 uses more bandwidth per packet than does a lower quality codec like G.729 or G.726.

All VoIP packets are made up of two components: voice samples and IP/UDP/RTP headers. Although the voice samples are compressed by a processor (usually located in the communication device, switch, or server) and may vary in size based on the codec used, the headers are a constant 40 bytes in length. As noted above, higher quality codecs create a larger voice payload than lower quality codecs. Customers would ideally like to use higher quality codecs all the time because of the quality of sound afforded by using the higher quality codec. Unfortunately, if higher quality codecs are used, a customer is more likely to exceed their allocated bandwidth than if they were using lower quality codecs. The additional costs for exceeding allocated bandwidth may be acceptable to customers that are not concerned with the price of communications. Regrettably, most suggested pricing models fail to consider the effect on businesses or other customers that have a somewhat limited budget for Internet service but still require a high quality of service.

These price sensitive customers could manually monitor their total bandwidth usage in an attempt to identify when the bandwidth usage is about to exceed the monthly quota. However, it is usually too late to take any actions to reduce the amount of bandwidth usage when total bandwidth usage is monitored manually. Short of discontinuing use of Internet services until the beginning of the next billing cycle, there is little a customer can do to stay within their allocated bandwidth usage when they are manually monitoring total bandwidth usage.

SUMMARY

These and other needs are addressed by various embodiments and configurations of the present invention. The present invention is directed generally to a dynamic communication system. More specifically, the communication system automatically adjusts the amount of voice bandwidth utilization based on total projected bandwidth utilization.

In accordance with one embodiment of the present invention, a method is provided for controlling bandwidth utilization. The method comprises the steps of:

(a) determining a threshold of total bandwidth utilization;

(b) estimating total bandwidth utilization for a time in the future based on previous bandwidth utilization;

(c) determining the estimated total bandwidth utilization will one of meet and exceed the threshold prior to the time in the future; and (d) decreasing streaming media bandwidth utilization.

A customer of an ISP may wish to decrease their streaming media bandwidth in an attempt to not exceed the threshold of total bandwidth utilization for a particular billing period. The customer may be concerned about exceeding the allocated bandwidth because additional charges may be imposed if the customer exceeds the allocated bandwidth. If it is estimated that the total bandwidth utilization will meet and/or exceed the threshold prior to the end of the billing period, the streaming media bandwidth utilization is decreased.

As used herein "streaming media" includes any type of live or recorded continuous media that is packetized for transmission across a packet-switched network. Examples of streaming media include, but are not limited to, audio media, video media, and combinations thereof. The bandwidth utilization of streaming media may be decreased in a number of different ways. For example, a first high quality codec may have been used for the first part of a billing cycle. After it is determined that the bandwidth utilization threshold will likely be met and/or exceeded, a second lower quality codec may be used for the rest of the billing cycle. The lower quality codec may have a lower bandwidth per packet payload than the first codec and as a result uses less bandwidth than the first codec. As can be appreciated, further estimations may be performed at a later time. If during these later estimations it is determined that the first codec may be used again without increasing the likelihood of exceeding the bandwidth utilization threshold, the second codec may be replaced with the first codec.

In accordance with at least some embodiments of the present invention, a server or the like monitors the amount of streaming media bandwidth that is utilized throughout a given period. Streaming media bandwidth may include both incoming and outgoing voice/video traffic in bytes. As the streaming media bandwidth utilization is monitored a historical record of streaming media bandwidth is maintained for the period. The server may also be enabled to monitor total bandwidth utilization or query the ISP for their cumulative usage statistics for the given period. The total bandwidth utilization may include both streaming media bandwidth usage and data upload/download usage.

As can be appreciated by one of skill in the art, "total bandwidth" may include all streaming media and other data bandwidth usage by a certain customer. Alternatively, total bandwidth may only include the amount of bandwidth that is used by a customer that will ultimately count against the customer's allocated bandwidth. For example, total bandwidth utilized may not include any data upload bandwidth usage because the ISP does not charge the customer for such activities. However, all other activities that require some use of the network bandwidth may count toward the total bandwidth.

In one embodiment, once the server has compared the amount of streaming media bandwidth used with the amount of total bandwidth used it can determine whether decreasing the streaming media bandwidth usage will have a large enough impact on total bandwidth usage. If decreasing the streaming media bandwidth usage may result in the total bandwidth threshold not being exceeded, the server may send a message to communication devices associated with the customer to use a different codec or otherwise decrease the amount of bandwidth used during streaming media applications. However, if the server determines that decreasing streaming media bandwidth usage will not have a large impact on the amount of total bandwidth used, then the server will not require a decreased streaming media bandwidth usage.

As used herein "bandwidth" is understood to mean an aggregate amount of traffic or amount of traffic over a network per unit time.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to monitor and control costs associated with utilizing network resources.

Figure 1:
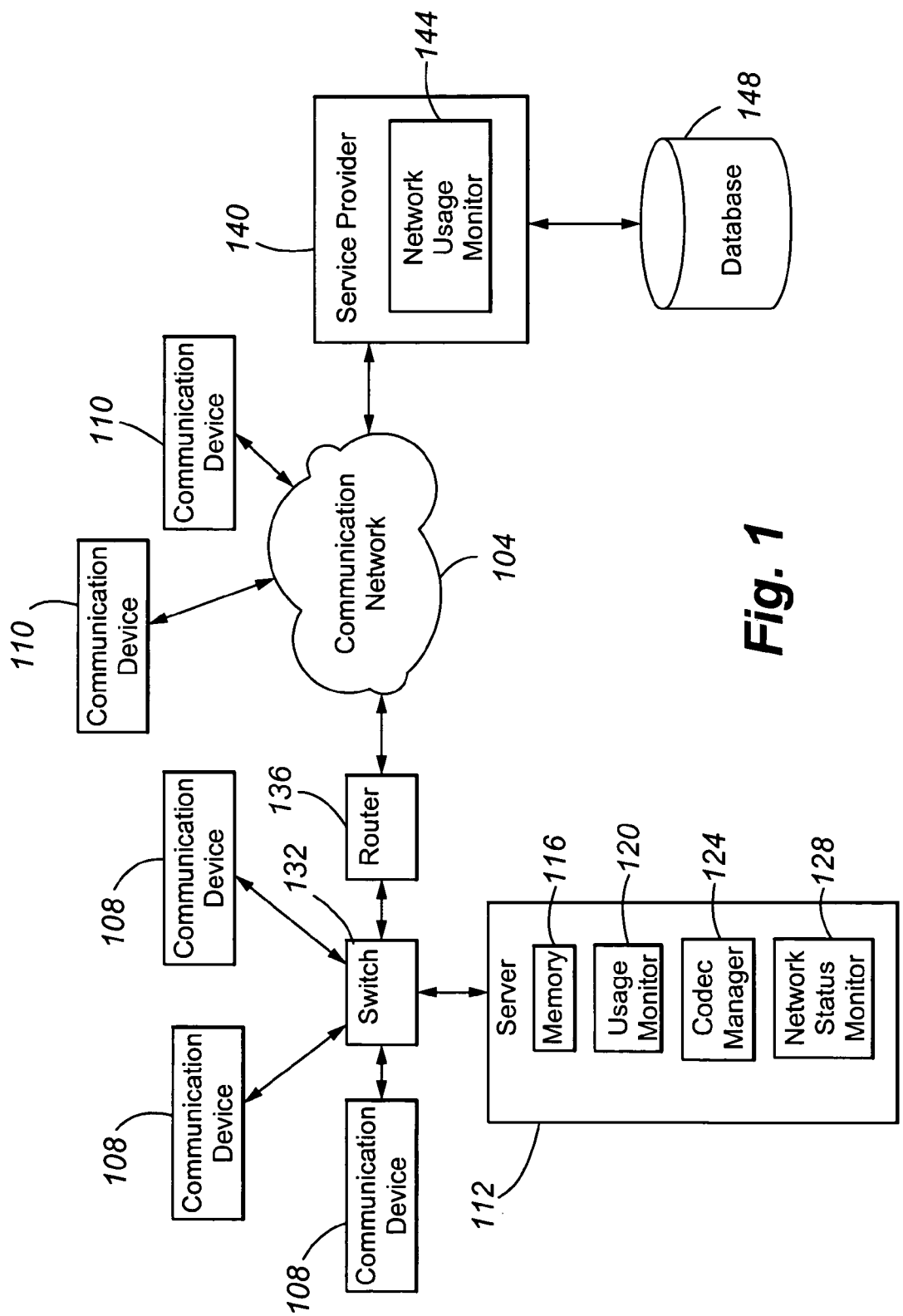
FIG. 1 is a block diagram depicting a communication system in accordance with embodiments of the present invention.

Referring initially to FIG. 1, a communication system 100 will be described in accordance with at least some embodiments of the present invention. The communication system 100 generally comprises a communication network 104, one or more communication devices 108 and 110, a server 112 comprising a memory 116, a usage monitor 120, a codec manager 124, and a network status monitor 128, a switch 132, a router 136, a service provider's server 140 comprising a network usage monitor 144, and a database 148.

The network 104 may be any type of suitable packet-switched communications network that is operable to transmit data from one communication endpoint to another endpoint via packets, where typical endpoints include the communication devices 108 and 110, the server 112, and the ISP server 140. Examples of suitable types of communication networks 104 include, but are not limited to, a Local Area Network (LAN), a Wide Area Network (WAN) like the Internet, and any other type of packet-switched network known in the art.

The communication devices 108 and 110 can be any of a number of packet-switched or circuit-switched devices including, without limitation, analog phone, digital phone, Personal Computer (PC), laptop, Personal Digital Assistant (PDA), IP hardphone, IP softphone, wireless phone, cellular phone, and networking equipment.

The first types of communication devices 108 are generally associated with a common enterprise. The first types of communication devices 108, in accordance with at least one embodiment of the present invention, comprise VoIP capabilities and can communicate with other communication devices 108, 110 utilizing IP protocols. The first types of communication devices 108 are connected to a switch 132 either through wired or wireless connection mechanisms. The switch 132 is further connected to the router 136 that provides for the first type of communication devices 108 to communicate with a second type of communication device 110 connected to the communication network 104.

The second types of communication devices 110 are connected to the communication network 104 via some mechanism other than the switch 132. The second types of communication devices 110 may be associated with the same enterprise as the first types of communication devices 110 or may be associated with a different enterprise. The second types of communication devices 110 may be circuit-switched, packet-switched, or both.

During a communication session, the communication device 108 captures selected audio and/or video (e.g., sounds and/or movements of the user) and generates an electrical representation of the captured sounds/movements. The communication device 108 then prepares the data (e.g., compresses the data using a suitable voice or video codec depending upon the media type captured) for transmission across the communication network 104 in packets. Once prepared, the data is transmitted to the switch 132, which subsequently forwards the data to the router 136. The router 136 modulates the packets of data and forwards the data to the communication device(s) 110 via the communication network 104. The receiving communication device(s) 110 generally have a modem associated therewith to demodulate the signal from the communication network 104 prior to transmitting the data to the communication device(s) 110. The receiving communication device(s) 110 are enabled to decompress the received data using a codec similar to the codec that was used to compress the data.

Similarly, a communication device 110 is operable to capture selected audio and/or video and generate an electrical representation of the captured sounds/movements. The communication device 110 compresses the data using a codec and transmits the data through the communication network 104 to the router 136. The router 136 may be operable to demodulate the data received from the communication network and forward the demodulated data to the switch 132. The switch 132 reads header information in the packet of data to identify the intended recipient of data. Once the recipient communication device 108 is identified the switch 132 sends the data to the communication device 108 where the data is decompressed and displayed to the user of the communication device 108.

As can be appreciated by one of skill in the art, a modem or the like may be used in lieu of or in combination with the router 136. For example, in a residential environment with an ADSL connection, a modem may be used to connect the communication device(s) 108 to the communication network 104. Alternatively, in a commercial setting using a low-speed WAN link, a different type of network may exist, in which case a router might be more appropriate.

The customer or enterprise associated with the communication devices 108 typically has an agreement with the ISP whereby the customer pays the ISP to use the communication network 104 bandwidth. The customer may pay the ISP on a per use basis or may pay a flat fee for a certain amount of bandwidth usage per billing cycle. In accordance with at least some embodiments of the present invention, the customer may pay to allow the first communication devices 108 or only a subset of the first communication devices 108 to use the network 104 bandwidth. The service agreement between the customer and the ISP outlines the amount of network resources, generally in the form of network bandwidth, that the customer is allocated per billing cycle. The billing cycle may renew every month, quarter of a year, or every year depending upon the service agreement. The service agreement between the ISP and the customer may also stipulate that the customer has to pay an additional amount for any bandwidth usage in a billing cycle beyond the allocated bandwidth.

The ISP server 140 monitors the network usage of each communication device 108 associated with the customer in an attempt to enforce or comply with the service agreement between the customer and the ISP. The ISP server 140 comprises a network usage monitor 144 that monitors the bandwidth usage of each communication device 108 and 110. The network usage monitor 144 determines which customer the communication device 108, 110 is associated with and stores the bandwidth usage for each customer in the database 148. In accordance with embodiments of the present invention, the network usage monitor 144 may be capable of differentiating between data upload/download bandwidth usage and streaming data transmission bandwidth usage.

The network usage monitor 144 generally differentiates between types of usage that fall under the service agreement and types of usage that do not fall under the service agreement. In other words, the network usage monitor 144 may determine that a customer has had data uploaded from their communication devices 108 and/or server 112. If the service agreement identified data uploads as bandwidth usage that does not count against the customer's allocated bandwidth usage, then the network usage monitor 144 will not commonly store the amount of bandwidth that was used to upload the data. However, the network usage monitor 144 may also determine that a communication device 108 of a particular customer has utilized bandwidth with streaming media transfers (i.e., through participation in a VoIP call). If streaming media transfers of data are bandwidth usage that is counted against the customer's allocated bandwidth usage, then the network usage monitor 144 records the amount of bandwidth utilized during the VoIP call and adds it to the total amount of bandwidth utilized by the customer during a billing cycle. The updated total amount of bandwidth utilized by the customer is then stored in the database 148 where it can be referenced at the end of the billing cycle to determine how much the customer owes the ISP for the given billing cycle.

In accordance with embodiments of the present invention, the server 112 is operable to monitor bandwidth usage of the communication devices 108 associated with a particular customer. The server 112 may be connected to the switch 132 and is operable to monitor network activity of the communication devices 108 through the switch 132. The server 112 comprises a memory 116, a usage monitor 120, a codec manager 124, and a network status monitor 128. The usage monitor 120 may be capable of monitoring all network bandwidth utilization for the customer's communication devices 108 and particularly bandwidth utilization patterns that are billable under the user's plan. In accordance with embodiments of the present invention, the usage monitor 120 is enabled to monitor the streaming media bandwidth utilization for the communication devices 108. More specifically, the usage monitor 120 can identify when a communication device 108 is using external network bandwidth as opposed to internal network bandwidth. Additionally, the usage monitor 120 records each occurrence of external streaming media bandwidth utilization for the communication devices 108. When streaming media is transmitted to/from a communication device 108 across the communication network 104, the usage monitor 120 records the amount of bandwidth utilized. The length of the communication session and the type of codec that was used to compress the data may assist in determining the amount of bandwidth utilized. Alternatively, the amount of bandwidth utilized may be directly monitored and recorded by each communication device 108. The communication devices 108 may then transmit the status of their bandwidth usage to the usage monitor 120.

The usage monitor 120 may determine that the communication devices 108 are communicating with one another, in which case the amount of bandwidth utilized will not be counted against network 104 bandwidth utilization. Such internal calls are generally not using network 104 bandwidth and therefore the ISP will not bill the customer for such communications. Rather, in accordance with embodiments of the present invention, the usage monitor 120 records the external communication activity.

As the usage monitor 120 records the network 104 bandwidth utilized by the communication devices 108 in incoming and/or outgoing communications, it sends periodic utilization updates to the memory 116. The usage monitor 120 may divide the amount of network 104 bandwidth utilized into incoming and/or outgoing data transfers (e.g., non-voice/video data transfers) and incoming and/or outgoing streaming media transfers (e.g., voice/video transfers). The usage monitor 120 can further distinguish streaming media transfers between voice and video transfers, if desired, prior to sending the information to the memory 116.

In accordance with one embodiment of the present invention, the network activity may be monitored using a Real-Time Control Protocol (RTCP). This particular protocol is the accompanying control protocol for the RTP and may be implemented by the server 112 to monitor network activity including bandwidth usage.

The memory 116 may keep a cumulative record, by channel, of the network 104 bandwidth utilized by the communication devices 108 during a specific billing cycle. Alternatively, or additionally, the memory 116 may maintain separate cumulative records of streaming media network 104 utilization and data transfer network 104 utilization. As can be appreciated, further subdivisions or combinations of previous and current bandwidth usage by a customer may be maintained in the memory 116 for a particular billing cycle. Furthermore, records of previous billing cycle bandwidth utilization may be maintained in memory 116 for comparison with other billing cycle utilization. By comparing the amount of bandwidth utilized in different billing periods, the server 112 may be able to identify trends in utilization and control the amount of streaming media bandwidth utilized more effectively.

In an alternative embodiment, the records of total network 104 bandwidth utilization for a given period may be retrieved from the ISP's server 140. The usage monitor 120 can query the network usage monitor 144 for total bandwidth utilized for the customer associated with the server 112 over a specified time period. The network usage monitor 144 can retrieve the requested information from the database 148 and forward that information on to the usage monitor 120.

Based on the records of bandwidth utilization maintained in memory 116, the usage monitor 120 is operable to determine if there is some likelihood that the customer will exceed a predetermined threshold of allocated bandwidth for a given billing cycle. The usage monitor 120 analyzes the historical amount of total bandwidth that has been used for the billing cycle and further analyzes the historical amount of streaming media bandwidth utilized for the same cycle. Based on the historic usage patterns (e.g., daily usage, by day of the week, time of day, day of the month, etc.) and/or the unused bandwidth under the plan for the selected time period (e.g., the predetermined threshold of allocated bandwidth), the usage monitor 120 can the likelihood that the customer will exceed the predetermined threshold of allocated bandwidth. The usage monitor 120 is further operable to determine if adjusting the amount of bandwidth used by streaming media applications will help the customer either in not exceeding the threshold or exceeding the threshold by a lower amount than would have occurred if the streaming media applications were not adjusted.

In accordance with at least some embodiments of the present invention, the codec manager 124 works in cooperation with the usage monitor 120. When the usage monitor 120 identifies that the amount of bandwidth used by streaming media applications should be adjusted, the codec manager 124 generates a message for transmission to the communication devices 108 and/or switch 132. The message requests that during streaming media data transfers lesser amounts of network 104 bandwidth are used. Communication between the usage monitor 120 and one or more of the communication devices 108 and/or switch 132, in one embodiment, may be implemented through a switch (i.e., a Layer 2 Ethernet switch or the like).

The codec manager 124, in at least one embodiment, identifies a new codec that should be used by the communication devices 108 during VoIP calls. The new codec generally uses less bandwidth on a per packet basis than the previously used codec and as a result, the amount of network 104 bandwidth utilization may be decreased at least until the end of the given period.

The network status monitor 128, in one embodiment, is another application residing on the server 112 that is capable of monitoring network 104 congestion and the like. In some service agreements between an ISP and customer, a provision may exist whereby the customer agrees to pay a premium for bandwidth usage during high network congestion. To mitigate costs associated with paying this premium, the network status monitor 128 identifies when the network 104 is so congested that a premium will be paid for bandwidth usage. When the network status monitor 128 identifies this type of congestion, it causes the codec manager 124 to generate a message for transmission to the communication devices 108 and/or switch 132 requesting them to use a lower bandwidth consumption codec for at least a predetermined amount of time. The predetermined amount of time may correspond to the typical amount of time that network congestion is known to exist. Alternatively, the message may request use of a lower bandwidth consumption codec until another message is received from the network status monitor 128 indicating that the network 104 is no longer congested.

As can be appreciated by one of skill in the art after appreciation of the current disclosure, the functionality of the server 112 may reside in the switch 132 or in each communication device 108. In other words, each communication device 108 may be able to self-monitor network 104 bandwidth utilization, and after a certain predetermined amount of bandwidth has been utilized in a given period, the communication device 108 may begin using a different lower bandwidth consumption codec to subsequently decrease the amount of streaming media bandwidth utilized on a per packet basis. Further in the alternative, the communication devices 108 may be able to communicate to one another their respective bandwidth utilization for a given period. Thereafter, a collective decision can be made by the communication devices 108 to reduce the amount of bandwidth consumed by streaming media applications.

The term "switch" or "server" as used herein should be understood to include a PBX, an enterprise switch, an enterprise server, or other type of telecommunications system switch or server, as well as other types of processor-based communication control devices such as media servers (i.e., email servers, voicemail servers, web servers, and the like), computers, adjuncts, etc.

It should be emphasized that the configuration of the server, user telecommunication devices, and other elements as shown in FIG. 1 is for purposes of illustration only and should not be construed as limiting the invention to any particular arrangement of elements.

Figure 2:
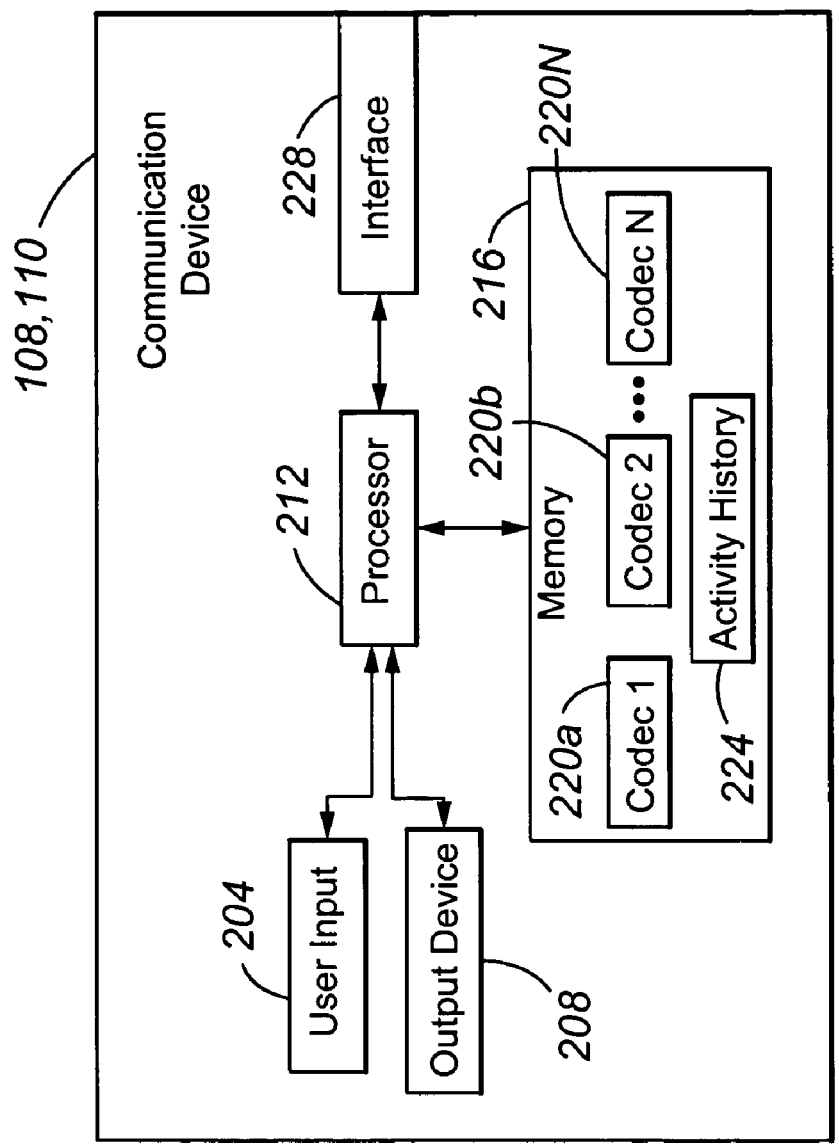
FIG. 2 is a block diagram depicting a communication device in accordance with embodiments of the present invention.

With reference now to FIG. 2, an exemplary communication device 108, 110 will be described in accordance with at least one embodiment of the present invention. The depicted communication device 108, 110 comprises a user input 204, an output device 208, a processor 212, a memory 216 including a number of codecs 220a-N where N is typically greater than or equal to one and an activity history log 224, and an interface 228. The communication device 108, 110 may comprise the typical functionality of a plain old telephone or PC (i.e., the ability to send and receive contacts via the communication network 104). More specifically, the communication device 108, 110 is able to send and/or receive packets of information in accordance with packet-switching communication principles.

The user input 204 may include, without limitation, a keyboard/keypad, a mouse or other type of pointing mechanism, a microphone or other type of voice transducer, and a video camera. The user input 204 functions to collect data from the user and transmit the received data to the processor 212. If the collected data is to be transmitted across the communication network 104, the processor 212 will package the information for transmission, if necessary, utilizing one or more codecs 220a-N stored in memory 216 and forward the data on to the interface 228 for transmission across the communication network 104.

The output device 208 is operable to display information to the user. Data received at the interface 228 from the communication network 104 is transmitted to the processor 212, which subsequently uses one or more of the codecs 220a-N to decode the received data. The processor 212 then forwards the data on to the output device 208 for presentation to the user. The displayed data may be audio, visual, live, recorded, streaming, static, or a combination thereof. The output device 208 may include, without limitation, a speaker, a Light Emitting Diode (LED) or collection of LEDs, an LCD display, a projection screen, a plasma screen, a beeper, or any other device capable of presenting data to a user of the communication device 108, 110.

The processor 212 is capable of performing predetermined functions that may be stored in memory 216. The processor 212 controls the functionality of the communication device 108, 110 and further processes incoming and outgoing data according to transmission protocols of the communication network 104. The processor 212 may be embodied as a microprocessor or similar type of processing chip. Alternatively, the processor 212 may include an Application Specific Integrated Circuit (ASIC), a programmable logic device (PLD), or a field programmable gate array (FPGA).

The interface 228 serves as the connection between the communication device 108, 110 and the communication network 104. The form of the interface 224 may vary depending upon the type of communication network 104 and telecommunication device 108. The interface 224 may include a modulation/demodulation unit for modulating data to be sent across the communication network 104 and demodulation data received from the communication network 104. The interface 224 may comprise, without limitation, a standard telephone interface, a modem, an Ethernet port and Ethernet card, a wireless interface, and so on. The protocols used to communicate with the communication network 104 may include known wired and/or wireless communication protocols.

The memory 216 is operable to store functions for the processor 212 to execute along with other information including, phone extension information, caller identification information, and user information. The memory 216 may include volatile and/or non-volatile memory. Examples of a suitable type of memory 216 include, but are not limited to, Random Access Memory (RAM), Dynamic RAM (DRAM), Read Only Memory (ROM), Programmable ROM (EPROM), Electronically Erasable EPROM (EEPROM), buffered memory, Flash memory, and the like.

The codecs 220a-N stored in memory 216 are used by the processor 212 to encode streaming data received at the user input 204 for transmission across the communication network 104 in packets and to decode packets of information received in packets from the communication network 104 to streaming media for transmission to the output device 208 and subsequent display to the user of the communication device 108, 110.

The activity history log 224 maintains records of the amount of incoming and/or outgoing channel and/or total bandwidth used by the communication device 108, 110 for any given period of time. Specifically, the activity history log 224 may store the amount of incoming and/or outgoing channel and/or total data transfer bandwidth utilized by the communication device 108, 110 and the amount of incoming and/or outgoing channel and/or total streaming media bandwidth utilized by the communication device 108, 110. As noted above, when the communication device 108, 110 receives a message from the usage monitor 120 requesting use of a lower bandwidth consumption codec, the processor 212 will discontinue use of a first type of codec 220a and begin use of a second type of codec 220b. The second codec 220b generally uses less bandwidth than the first codec 220a on a per packet basis. As can be appreciated, the communication device 108, 110 may also receive a message requesting use of a higher bandwidth consumption codec. In that case, the processor 212 may begin using the first codec 220a or another higher quality codec in substitution for the other codec that was previously being used.

Figure 3:
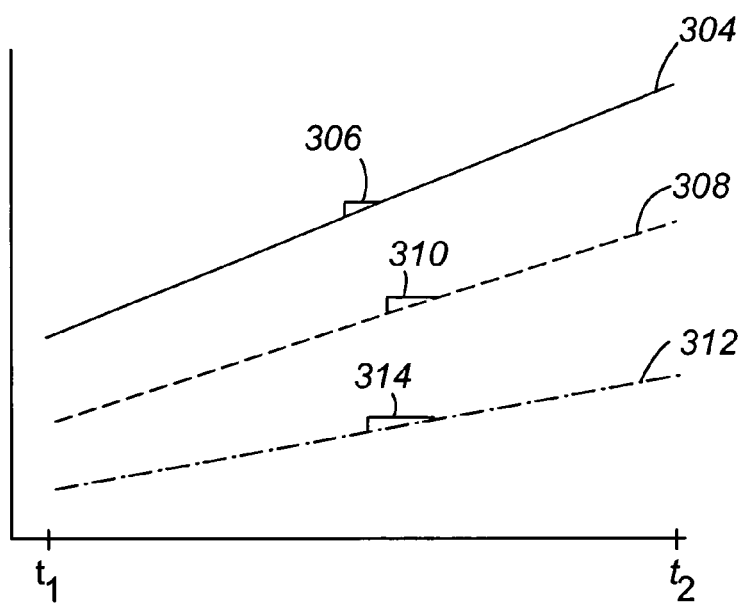
FIG. 3 is a graph depicting cumulative bandwidth usage in accordance with embodiments of the present invention.

Referring now to FIG. 3 a bandwidth utilization chart will be discussed in accordance with at least some embodiments of the present invention. The bandwidth utilization chart may be stored partially or completely in memory 116 of the server 112, the database 148, and/or the memory 216 of a communication device 108, 110. The bandwidth utilization chart shows a total amount of bandwidth utilization curve 304 between times $t_1$ and $t_2$. The total bandwidth utilized is shown increasing in a somewhat linear fashion. However, the total bandwidth utilization curve 304 may be line of best fit for a number of data points that are not necessarily linear. In other words, the total bandwidth utilization curve 304 may be linear approximation of total bandwidth used between times $t_1$ and $t_2$. Since the total bandwidth utilization curve 304 is shown as a linear approximation of bandwidth usage, the total bandwidth utilization curve 304 comprises a gradient 306 or slope. The gradient 306 provides an indication of the rate of total bandwidth usage over a particular period of time.

The total bandwidth utilization curve 304, which may be maintained by channel or for both channels is essentially the sum of a streaming media bandwidth utilization curve 308 and a data transfer bandwidth utilization curve 312. Similar to the total bandwidth utilization curve 304, the streaming media bandwidth utilization curve 308 and data transfer bandwidth utilization curve 312 may be approximations or a line of best fit representing a number of data points collected at discrete times. For example, the usage monitor 120 may determine the amount of streaming media bandwidth utilized every day. Likewise, the usage monitor 120 may query the ISP's server 140 to determine total bandwidth utilization for the same day. The records of bandwidth utilization for each day may be stored in memory 116 and the bandwidth utilization chart may be a result of linear approximations of bandwidth utilization over the course of many days.

As can be seen in FIG. 3, the streaming media bandwidth utilization curve 308 comprises a gradient (e.g., slope) 310 and the data transfer bandwidth utilization curve 312 comprises a gradient 314. The gradients of each utilization curve are generally not equal. Rather, the total bandwidth utilization gradient 306 is usually the sum of the streaming media bandwidth utilization gradient 310 and the data transfer bandwidth utilization 314. If the streaming media bandwidth utilization gradient 310 is relatively close to the total bandwidth utilization gradient 306 (i.e., the gradient 310 is greater than half of the total bandwidth utilization gradient 306), then the total bandwidth utilization is generally influenced more by the streaming media bandwidth utilization. In other words, if the gradients of total bandwidth utilization and streaming media bandwidth utilization are relatively close to one another, then a substantial decrease in streaming media bandwidth utilization will likely result in a substantial decrease in total bandwidth utilization.

On the other hand, if the streaming media bandwidth utilization gradient 310 does not make up a relatively large portion of the total bandwidth utilization gradient 306 (i.e., the gradient 310 is less than about 10 percent of the total bandwidth utilization gradient 306), then the total bandwidth utilization is generally not influenced by streaming media bandwidth utilization. Stated in another way, if the gradients of total bandwidth utilization and streaming media bandwidth utilization are not relatively close, then a substantial decrease in streaming media bandwidth utilization will likely not result in a substantial decrease in total bandwidth utilization.

Additionally, a comparison of the streaming media bandwidth utilization gradient 310 and data transfer bandwidth utilization gradient 314 may also help to determine which is a larger contributor to the total bandwidth utilization for a customer. The type of bandwidth utilization that has a larger gradient is likely the type of bandwidth utilization that is contributing more to a customer's total bandwidth utilization. For example, if the streaming media bandwidth utilization gradient 310 is larger than the data transfer bandwidth utilization gradient 314, then the streaming media bandwidth utilization contributes more to total bandwidth utilization than the data transfer bandwidth utilization does. If the streaming media bandwidth utilization gradient 310 is larger than the data transfer bandwidth utilization gradient 314, then a substantial decrease in streaming media bandwidth utilization will likely result in a substantial decrease in total bandwidth utilization.

As can be appreciated by one of skill in the art, the approximations of the bandwidth utilization do not necessarily need to be linear approximations. Rather, non-linear approximations may be used to create a better line of fit for data points in a given period. In the event that non-linear approximations are used to represent bandwidth utilization, the gradients may be scalar, linear, or non-linear, depending upon the original approximation of the line. A bandwidth utilization gradient may be determined by taking the derivative of the approximation line. Thereafter, the gradients of different types of bandwidth utilizations may be compared to determine the relatedness between types of bandwidth utilizations.

Figure 4:
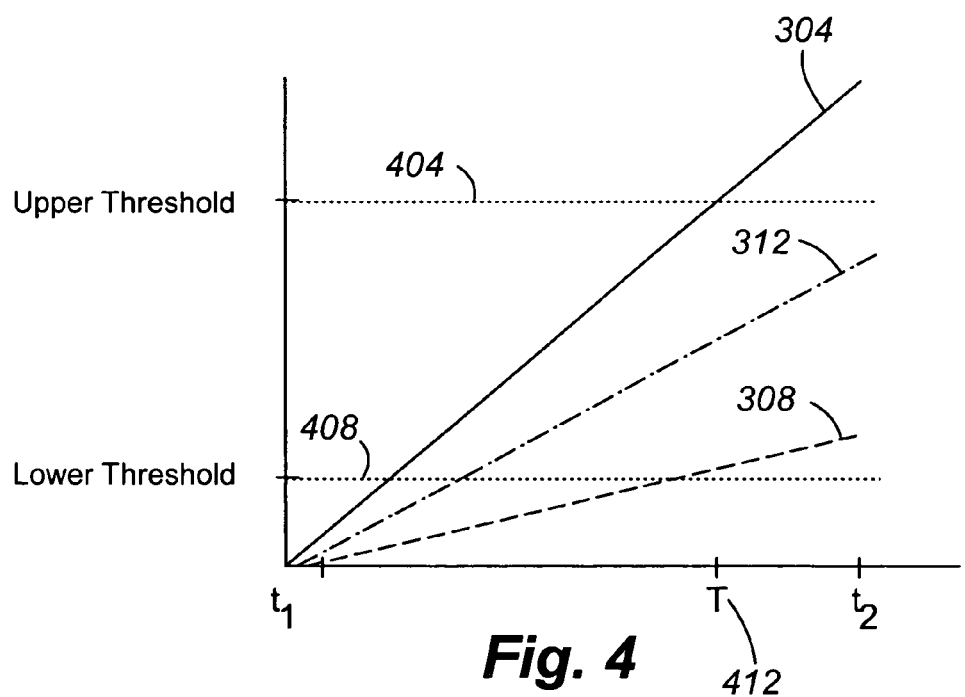
FIG. 4 is a graph depicting cumulative bandwidth usage for a given period in accordance with embodiments of the present invention.

Referring now to FIG. 4, a bandwidth utilization chart having utilization thresholds will be described in accordance with at least some embodiments of the present invention. The bandwidth utilization chart depicts total bandwidth utilization 304, streaming media bandwidth utilization 308, and data transfer bandwidth utilization 312 for a period of time between $t_1$ and $t_2$. The period depicted may be for a particular billing cycle or for a given month. At the beginning of the period, there was no cumulative bandwidth utilization and as time progressed, total bandwidth utilization increased as a result of streaming media bandwidth usage and data transfer bandwidth usage.

For the depicted period thresholds of bandwidth utilization may be determined. The upper bandwidth utilization threshold 404 represents the maximum amount of bandwidth that may be used without incurring additional costs. In other words, the upper bandwidth utilization threshold 404 may represent the amount of bandwidth a customer is allocated for a given billing cycle. After the upper threshold 404 is met or exceeded, the customer may be required to pay a premium for bandwidth usage or may experience a decrease in service. The total bandwidth utilization curve 304 is shown exceeding the upper threshold 404 at time T 412. After time T 412, the customer will be incurred these penalties until at least the end of the period. Once the period is over, the bandwidth utilization may be reset for the next period and the customer is given a new allocation of bandwidth for the new period. In other words, the cumulative bandwidth utilization 304 is set back to zero after time $t_2$.

Conversely, the lower bandwidth utilization threshold 408 represents a minimum amount of bandwidth that a customer would like to use in a given period. The customer may have already paid or agreed to pay a flat fee for bandwidth usage up to the upper threshold 404. The customer would like to ensure that bandwidth paid for is not wasted. Thus, the lower threshold 408 may be the amount of bandwidth that should be used to make paying for the allocated bandwidth cost effective. The lower threshold 408 may be any value lower than or equal to the upper threshold 404. If the lower threshold 408 equals the upper threshold 404, then the customer is indicating that full use of allocated bandwidth is desired.

Figure 5:
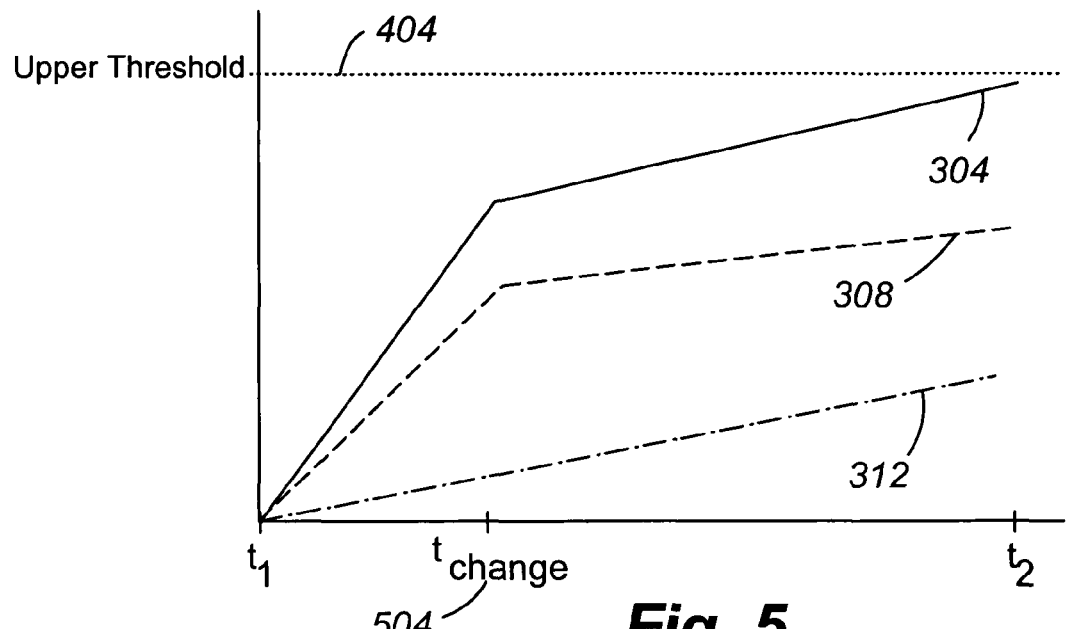
FIG. 5 is a graph depicting a decrease in bandwidth utilization in accordance with embodiments of the present invention.

Referring now to FIG. 5, a decrease in bandwidth usage will be described in accordance with at least some embodiments of the present invention. The upper threshold 404 for a given period between $t_1$ and $t_2$, as noted above, is the point where a customer may begin paying for additional bandwidth utilization. A collection of data points prior to $t_{CHANGE}$ 504 depict an increase in bandwidth utilization that would have likely exceeded the upper threshold 404 prior to the end of the period. The usage monitor 120 identified this high rate of bandwidth usage and decreased the streaming media bandwidth utilization 308 in an attempt to decrease the total bandwidth utilization 304. Since the streaming media bandwidth utilization 308 comprised a substantial portion of total bandwidth utilization 304, a decrease in streaming media bandwidth utilization 308 resulted in a substantial decrease in total bandwidth utilization 304. Because the total bandwidth utilization was changed early enough in the period, excessive costs associated with exceeding the upper threshold 404 were mitigated or eliminated.

An extrapolation of the total bandwidth utilization curve 304 at the time $t_{CHANGE}$ indicated that the upper threshold 404 was likely to be exceeded. Since it was determined that there was some amount of likelihood that the upper threshold 404 would be exceeded prior to the end of the period, the streaming media bandwidth utilization was decreased. Total bandwidth utilization may be determined to exceed the upper threshold 404 with some degree of likelihood if the extrapolated bandwidth utilization exceeds or meets the upper threshold 404 within a certain percentage amount. For example, if the extrapolated bandwidth utilization exceeds the upper threshold 404 by 10 percent, then it may be determined that the bandwidth utilization will likely exceed the upper threshold 404 prior to the end of the period. Conversely, if it is determined that the extrapolated bandwidth utilization exceeds the upper threshold 404 by only 3 percent, then it may be determined that the bandwidth utilization will not likely exceed the upper threshold. Alternatively, in the event that the extrapolated bandwidth utilization will be within about +/−5 percent of the upper threshold 404, then it may be determined that the bandwidth utilization will likely exceed the upper threshold 404 prior to the end of the period.

In other embodiments, the usage monitor 120 can use an average, highest, lowest, most frequent, or median rate of change multiplied by the days remaining in the current billing period to determine a projected bandwidth usage for the remainder of the period. If the sum of the historic and projected bandwidth exceeds the upper threshold 404, it is determined that the user will likely exceed the threshold 404. In yet another embodiment, the rate of change is not employed. Rather, the usage pattern in the current period is compared with a lookup table. The lookup table indexes selected bandwidth usage targets against elapsed time in the current billing cycle. For example, if the user has utilized more than a first target during a first subperiod of the current billing cycle, the usage monitor 120 concludes that the user will likely exceed the threshold 404 for the period. If at a later time, the user has utilized less than a second target during a second subperiod of the current billing cycle (which may include the first subperiod), the usage monitor 120 concludes that the user will likely not exceed the threshold In one embodiment, once the determination is made that the upper threshold 404 is likely to be met or exceeded, the usage monitor 120 decreases the amount of bandwidth (e.g., streaming media bandwidth and/or data transfer bandwidth) utilization on a per packet basis. The usage monitor 120 may send a message to the communication devices 108 requesting them to use a codec that requires less bandwidth on a per packet basis. For example, the communication devices 108 may switch from using a G.711 codec that uses 160 bytes of voice bandwidth on a per packet basis to using a G.729 codec that only uses 20 bytes of voice bandwidth on a per packet basis. Alternatively, header compression schemes like compressed RTP (cRTP) may be employed by the communication devices 108 to decrease the amount of bandwidth required for the header. Further in the alternative, the communication devices 108 may utilize voice activity detection in which only packets with detected voice activity are transmitted across the communication network 104. Packets without detected voice activity are simply not transmitted resulting in less bandwidth usage over time.

While the streaming bandwidth utilization is decreased in an attempt to decrease the total bandwidth utilization, the data transfer bandwidth utilization may be maintained at a constant level. Not requiring a decrease in data transfer bandwidth utilization allows the decrease in total bandwidth utilization to be automated. The usage monitor 120 can continuously monitor bandwidth utilization and determine when a decrease in utilization is necessary. Once the usage monitor 120 determines that total bandwidth needs to be decreased, the usage monitor 120 automatically notifies the communication devices 108 to decrease bandwidth utilization, rather than requiring employees to use the communication devices 108 less frequently or for as long.

Figure 6:
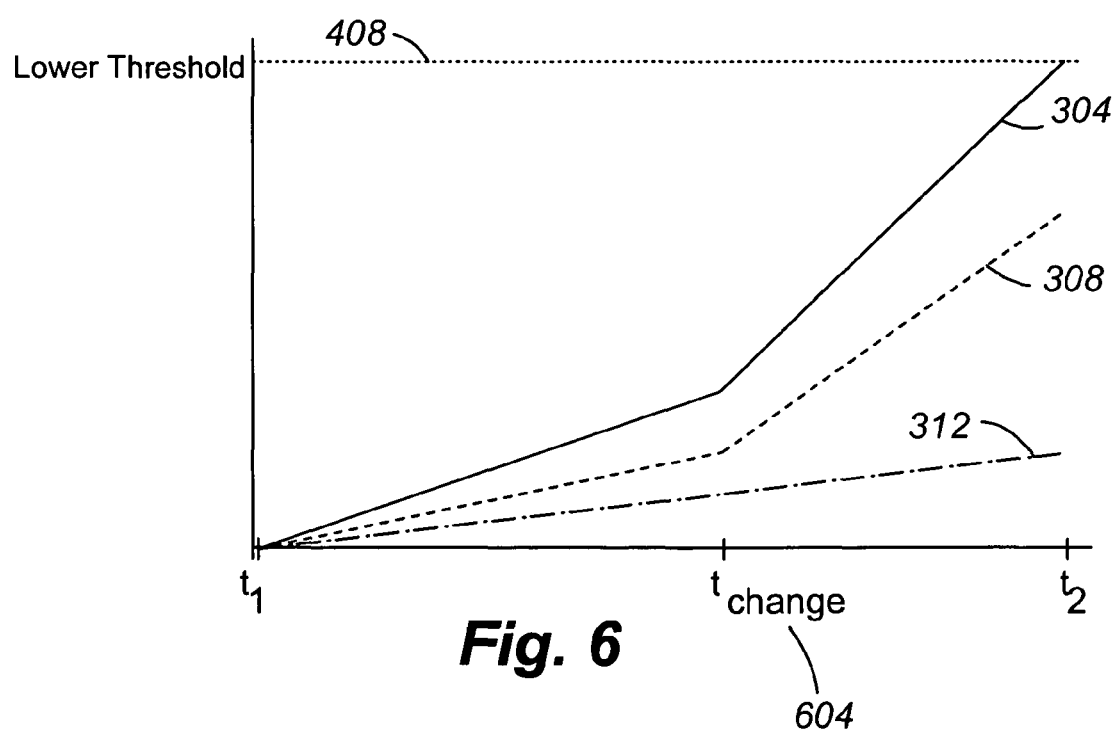
FIG. 6 is a graph depicting an increase in bandwidth utilization in accordance with embodiments of the present invention.

Referring now to FIG. 6, an increase in bandwidth usage will be described in accordance with at least some embodiments of the present invention. The lower threshold 408 for a given period between $t_1$ and $t_2$, as noted above, is the minimum amount of bandwidth that a customer would like to use in the period. A collection of data points prior to $t_{CHANGE}$ 604 depict an increase in bandwidth utilization that would have likely not meet the lower threshold 408 prior to expiration of the period. The usage monitor 120 identified this low rate of bandwidth usage and increases the streaming media bandwidth utilization 308 in an attempt to increase the total bandwidth utilization 304. Since the streaming media bandwidth utilization 308 comprises a substantial portion of total bandwidth utilization 304, an increase in streaming media bandwidth utilization 308 resulted in a substantial decrease in total bandwidth utilization 304. The customer now can use a higher quality codec or the like to transmit streaming media across the communication network 104. This also allows the customer to feel that they are receiving their money's worth for the bandwidth that will be paid for, regardless of whether the bandwidth is completely used or not.

An extrapolation of the total bandwidth utilization curve 304 at the time $t_{CHANGE}$ indicated that the upper threshold 404 was likely not to meet or exceed the lower threshold 408. The extrapolated total bandwidth utilization may not have been within a certain percent of the lower threshold 408 at the end of the period and the usage monitor 120 determined that bandwidth utilization should be increased. For example, the usage monitor 120 may increase bandwidth utilization if the extrapolated total bandwidth utilization is not within about +/−10 percent of the lower threshold.

As can be appreciated by one of skill in the art, bandwidth utilization for a given period may be divided into various classifications. For example, a customer may be charged a certain rate for bandwidth usage during peak hours between 8:00 AM and 7:00 PM, whereas the customer may be charged a different rate for bandwidth usage during non-peak hours between 7:00 PM and 8:00 AM. Thus, bandwidth utilization can be tracked separately for both the peak and non-peak hours. During the peak hours, the amount of bandwidth utilization may be adjusted to stay within certain peak thresholds. The non-peak hours may have a different threshold and for that reason bandwidth utilization during non-peak hours may be adjusted by a different amount from the peak hours. Therefore, the usage monitor 120 may track bandwidth usage during different times separately within the same billing period. Moreover, the usage monitor 120 may treat bandwidth usage differently depending upon the time of day, day of the week, and so on.

Figure 7:
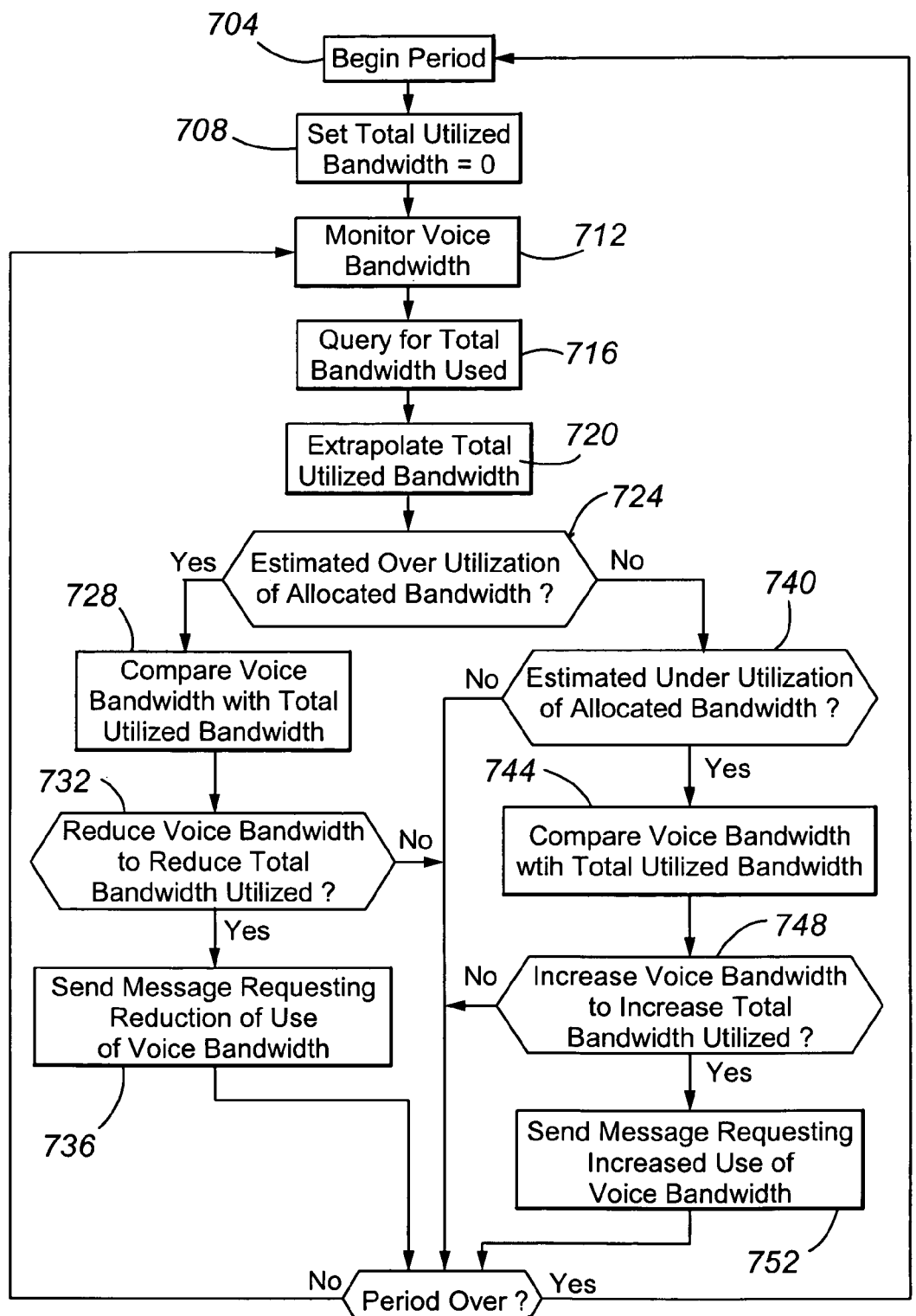
FIG. 7 is a flow chart depicting a method of controlling bandwidth utilization in accordance with embodiments of the present invention.

Referring now to FIG. 7 a method of managing bandwidth utilization will be described in accordance with at least some embodiments of the present invention. The method begins at the beginning of a particular period (step 704). The period may begin on the first of the year, quarter, month, week, day, or other billing cycle starting point. After the billing cycle begins, the total bandwidth utilized for the period is set equal to zero (step 708). The usage monitor 120 then begins monitoring streaming media bandwidth utilization, typically in the form of voice bandwidth utilization and/or data transfer utilization, at the beginning of the period (step 712). The usage monitor 120 continues monitoring the streaming media bandwidth utilization and/or data transfer utilization either on a continuous basis or on a periodic basis (e.g., every minute, hour, day, etc.). As the usage monitor 120 monitors streaming media bandwidth utilization and/or data transfer utilization, it stores records of the utilization in memory 116. The usage monitor 120 also tracks the total amount of bandwidth utilization. Total bandwidth utilization may be determined by querying the network usage monitor 144 of the ISP server 140 on a periodic basis for the total bandwidth utilized (step 716). The total bandwidth utilization and streaming media bandwidth utilization is stored in memory 116 as the bandwidth utilization chart is generated and updated.

After at least a couple data points have been collected, the usage monitor 120 may be able to approximate a linear representation of the bandwidth utilization data points. The bandwidth utilization is then extrapolated to the end of the period (step 720). It is then determined, based on the extrapolated bandwidth utilization, if the allocated bandwidth will be exceeded (step 724). Stated in another way, the usage monitor 120 determines whether the extrapolated bandwidth will meet or exceed the upper threshold 404. As previously noted, it may be determined that the extrapolated bandwidth will meet or exceed the upper threshold even if the extrapolated bandwidth is less than the upper threshold 404, but within a certain amount of the upper threshold 404.

In the event that it is determined that the upper threshold of bandwidth utilization 404 will likely be exceeded, the streaming media bandwidth utilization curve 308 and/or its gradient 310 is compared with the total bandwidth utilization curve 304 and/or its gradient 306 (step 728). As noted above, the total bandwidth utilization curve 304 and/or its gradient 306 may be compared with the data transfer bandwidth utilization curve 312 and/or gradient 314 instead of comparing total bandwidth utilization with streaming media bandwidth utilization. Likewise, the streaming media bandwidth utilization curve 308 and/or its gradient 310 may be compared with the data transfer bandwidth utilization curve 312 and/or gradient 314.

Once the bandwidths have been compared, it is determined if a reduction in streaming media bandwidth utilization will result in a substantial reduction of total bandwidth utilization (step 732). In other words, if the streaming media bandwidth utilization represents a non-trivial amount of the total bandwidth utilized (e.g., the streaming media bandwidth utilization is at least about 10 percent of total bandwidth utilization), then a reduction in streaming media bandwidth utilization will likely result in a substantial reduction of total bandwidth utilization.

If it is determined that a decrease in bandwidth utilization will not likely result in a substantial decrease of total bandwidth utilization, then the method continues to step 756 where it is determined if the period has expired. If it is determined that a reduction in streaming media bandwidth utilization will help to decrease the amount of total bandwidth utilization, then the usage monitor 120 sends a message to the communication devices 108 and/or switch 132 requesting a reduction of use of streaming media bandwidth (step 736). The usage monitor 120 may reference the codec manager 124 to determine what types of codecs the communication devices 108 are currently using and can further request the codec manager 124 to suggest a new codec. The message transmitted from the usage monitor 120 may contain the type of codec that the communication device 108 should switch to using when transferring streaming media. In one embodiment, the new codec to be used by the communication devices 108 is a lower bandwidth consumption codec than the previously used codec. The use of a lower bandwidth consumption codec results in a decrease of bandwidth usage on a per packet basis. After the communication devices 108 have been asked to use lower bandwidth consumption codecs, it is determined if the period has expired (step 756). In the event that the period has expired, the method returns to step 704 and a new period begins. In the event that the period has not yet expired, the method returns to step 712 where the usage monitor 120 continues to monitor streaming media bandwidth usage.

Returning to step 724, in accordance with at least one embodiment, in the event that it is not determined that the total bandwidth utilization will likely meet or exceed the upper threshold 404, then it is determined if the total bandwidth is likely to meet the lower threshold 504 (step 740). In this step, the usage monitor 120 identifies whether the amount of bandwidth utilized in the period is likely to be underutilized. If the usage monitor 120 does not determine that bandwidth will be underutilized, then the method continues to step 756 where it is determined if the period is over. However, in the event that the usage monitor determines that bandwidth may be underutilized, then the streaming media bandwidth utilization is compared with the total bandwidth utilization (step 744). However, similar to step 728, other types of bandwidth utilization and their corresponding gradients may be compared in an attempt to determine the relationship among the types of bandwidth utilization.

Once the bandwidths have been compared, it is determined if an increase in streaming media bandwidth will likely result in a substantial increase in total bandwidth utilized (step 748). As an example, if the streaming media bandwidth is less than about 10 percent of total bandwidth utilization, then an increase in streaming media bandwidth utilization will likely result in an increase of total bandwidth utilization. If it is determined that increasing the streaming media bandwidth utilization will not likely increase total bandwidth utilization, then the method may continue to step 756. Thereafter, other measures should be taken to increase the amount of total bandwidth utilization to the point where the lower threshold 504 is at least met or exceeded. On the other hand, if it is determined that increasing the streaming media bandwidth utilization will likely result in an increase of total bandwidth utilization, then the usage monitor 120 sends a message to the communication devices 108 and/or switch 132 requesting use of a higher bandwidth consumption codec (step 752). As can be appreciated by one of skill in the art, even if it is determined that increasing streaming media bandwidth usage will not likely result in an increase of total bandwidth usage, the amount of bandwidth utilized by streaming media applications may be increased in an attempt to achieve the highest possible quality of service. The goal of meeting the lower threshold 504 may not be met, but at least a higher quality codec can be used. Once the message has been sent to the communication devices 108, the method continues to step 756 where it is determined if the period is over.

Figure 8:
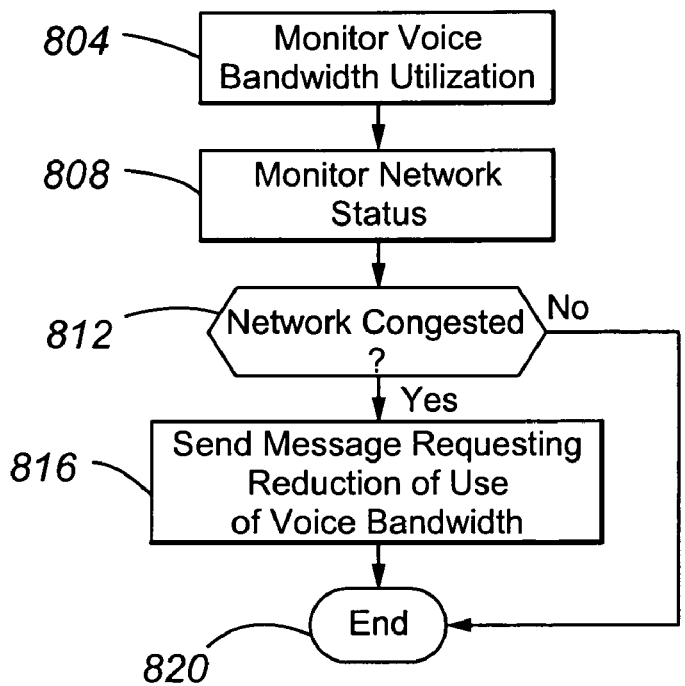
FIG. 8 is a flow chart depicting a method of monitoring network activity in accordance with embodiments of the present invention.

Referring now to FIG. 8, an alternative method of managing bandwidth consumption will be described in accordance with at least some embodiments of the present invention. Initially, the usage monitor 120 monitors streaming media and/or data transfer bandwidth utilization along with total bandwidth utilization (step 804). The network status monitor 128 then checks the status of the network (step 808). The network status monitor 128 may check the status of the network by sending a test packet across the network to a remote point and then determining how long it took the packet to reach its destination. The test packet may also be transmitted back to the network status monitor 128 from the remote target and the status of the network can be determined by measuring various parameters associated with sending the packet across the network (e.g., transmission time, jitter, and any other parameters used to identify quality of service). Upon receipt and analysis of the test packet, the network status monitor 128 determines if the network is congested (step 812).

The network may be congested because there is a large amount of traffic on the network at substantially the same time or because of some type of network failure. Some types of network congestions may result in the customer being charged a premium for network bandwidth utilization. When the network status monitor 128 has identified that some premium may need to be paid for the used of network bandwidth, then the usage monitor 120 references the codec manager 124 to determine what type of codec the communication devices 108 should use during streaming media applications. The usage monitor 120 then sends a message to the communication devices 108 requesting use of a lower bandwidth consumption codec (step 816). Thereafter, the method ends at step 820. In the event that the network status monitor 128 did not identify any network congestion, then the current codecs can be used and no message needs to be sent by the usage monitor 120. Thus, the method can skip directly to step 820.

Figure 9:
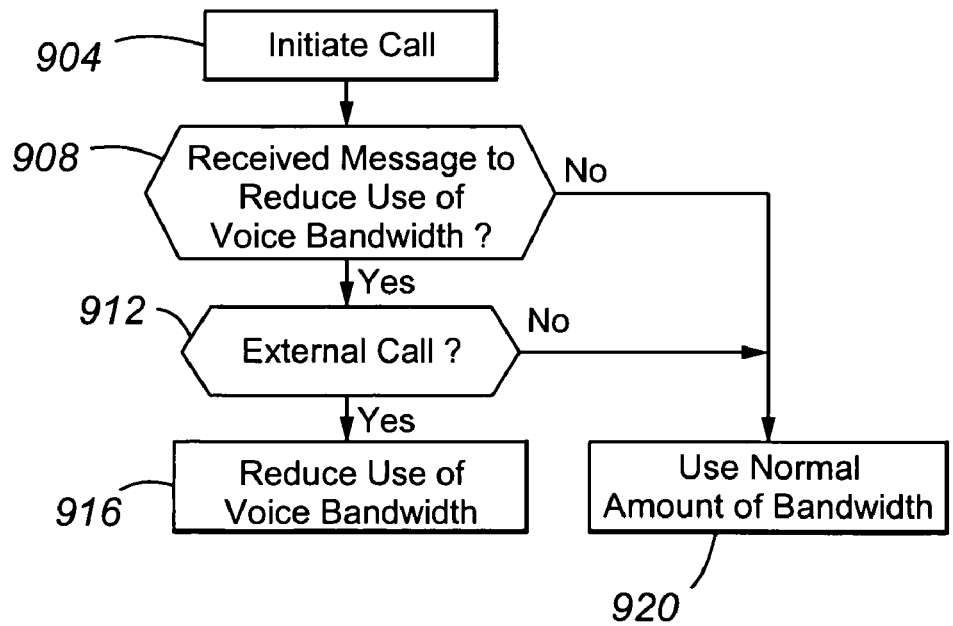
FIG. 9 is a flow chart depicting a method of differentiating bandwidth usage based on internal and external calls in accordance with embodiments of the present invention.

Referring now to FIG. 9, a method of differentiating between internal and external calls will be described in accordance with at least some embodiments of the present invention. The method begins when a contact, usually in the form of a call, is initiated or is about to be initiated by a communication device 108 (step 904). Thereafter, it is determined whether a message to use a reduced bandwidth consumption codec has been received (step 908). In the event that no such message has been received in the given billing period, then the communication device 108 has no outstanding orders to use a lower bandwidth consumption codec and can use a default codec to transfer streaming media across the communication network 104 (step 920). However, in the event that the communication device 108 has received a message to use a lower amount of bandwidth during streaming media applications, then the communication device 108 determines if the contact/call is being conducted with an external communication device 110. In other words, the communication device 108 determines if network bandwidth will be utilized during the streaming media transfer. The determination of whether the contact is being placed with an outside communication device 110 may be completed in a number of ways. For example, the destination address for the communication device 110 may indicate that the communication device 110 is external to the enterprise network of the communication device 108. Alternatively, if an extension is entered by the user, then the communication device 108 may know that the contact is to an external communication device 110. In the event that the contact is not being sent to an external communication device 110 (i.e., the contact is going to an internal communication device 108), then the method can continue to step 920 where a default codec can be used. However, in the event that the contact is going to an external communication device 110, then the communication device 108 will reduce the amount of bandwidth used by the codec (step 916).

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method comprising:
   (a) predicting, by a processor, that a bandwidth utilization threshold will likely be one of met and exceeded by a first user, wherein, in the predicting step, the processor determines that at least one of (i) a historic bandwidth usage in a selected billing period and (ii) a projected bandwidth usage in the selected billing period is above the bandwidth utilization threshold;
   (b) in response, selecting, by the processor, a lower quality codec to be used by a plurality of selected future communications of the first user during the selected billing period; and
   (c) thereafter applying the lower quality codec to the selected future communications.

2. The method of claim 1, wherein the selected future communications comprise streaming media and wherein, in step (b), the processor switches from a first type of codec that utilizes a first amount of bandwidth per packet to a second type of codec that utilizes a second amount of bandwidth per packet, wherein the second amount of bandwidth per packet is less than the first amount of bandwidth per packet, and wherein the processor at least one of compresses a real-time transfer protocol (RTP) header and suppresses packets of silence.

3. The method of claim 1, wherein the processor determines that the historic bandwidth usage in the selected billing period is above the bandwidth utilization threshold and wherein the historical bandwidth usage in the selected billing period comprises at least one of (i) the amount of total bandwidth utilized in the selected billing period up to a time of prediction and (ii) the amount of voice bandwidth utilized and the amount of data bandwidth utilized in the selected billing period up to the time of prediction.

4. A non-transitory computer readable medium comprising processor executable instructions to perform the method of claim 1.

5. A method comprising:
   predicting, by a processor, that a bandwidth utilization threshold will likely be one of met and exceeded by a first user;
   in response, selecting, by the processor, a lower quality codec to be used by selected communications of the first user;
   thereafter applying the lower quality codec to the selected communications, wherein the processor determines that the historic bandwidth usage in the selected period is above the bandwidth utilization threshold and the historic bandwidth usage comprises at least one of total bandwidth utilization, voice bandwidth utilization, and non-voice bandwidth utilization;
   identifying a line of best fit for at least one of the previous total bandwidth utilization, previous voice bandwidth utilization, and previous non-voice bandwidth utilization;
   determining a gradient for the identified line of best fit; and
   comparing at least one of:
   (i) the gradient of a previous total bandwidth utilization and the gradient of the previous voice bandwidth utilization;
   (ii) the gradient of a previous total bandwidth utilization and the gradient of the previous non-voice bandwidth utilization; and
   (iii) the gradient of a previous voice bandwidth utilization and the gradient of the previous non-voice bandwidth utilization.

6. A method comprising:
   predicting, by a processor, that a bandwidth utilization threshold will likely be one of met and exceeded by a first user;
   in response, selecting, by the processor, a lower quality codec to be used by a plurality of selected future communications of the first user;
   thereafter applying the lower quality codec to the plurality of selected future communications, wherein the processor determines that the historic bandwidth usage in the selected period is above the bandwidth utilization threshold and further comprising:
   obtaining historic bandwidth usage from an Internet service provider (ISP);
   monitoring streaming media bandwidth utilization; and
   storing the monitored streaming media bandwidth utilization and obtained historic bandwidth usage.

7. A system for controlling bandwidth utilization, comprising:
   a processor configured to
   (a) predict that a bandwidth utilization threshold will likely be one of met and exceeded by a first user;
   (b) in response, select a lower quality codec to be used during a plurality of selected future communications of the first user; and
   (c) thereafter apply the lower quality codec to the plurality of selected future communications, wherein the processor predicts that the bandwidth utilization threshold is likely one of met and exceeded by a first user by determining, at a time during a selected billing period, that at least one of (i) a historic bandwidth usage in the selected billing period, (ii) a projected bandwidth in the selected billing period, and (iii) a degree of network congestion over a selected link is above the bandwidth utilization threshold, and cause at least one communication device to use a decreased amount of bandwidth for the selected period in response to determining that at least one of (i), (ii), and (iii) is true.

8. The system of claim 7, wherein the plurality of selected future communications comprise streaming media bandwidth and wherein the processor causes at least one communication device to decrease streaming media bandwidth utilization by causing the following to occur:
   (i) the at least one communication device to switch from a first type of codec that utilizes a first amount of bandwidth per packet to a second type of codec that utilizes a second amount of bandwidth per packet, wherein the second amount of bandwidth per packet is less than the first amount of bandwidth per packet.

9. The system of claim 7, wherein the processor is configured to perform at least one of the following:
   (i) a real-time transfer protocol (RTP) header to be compressed; and
   (ii) packets of silence to be suppressed.

10. The system of claim 7, wherein the processor predicts that the bandwidth utilization threshold is likely one of met and exceeded by a first user by determining that a historic bandwidth usage exceeds the bandwidth utilization threshold and wherein the historic bandwidth usage comprises at least one of (i) the amount of total bandwidth utilized in the selected period up to a time of the prediction and (ii) the amount of voice bandwidth utilized and the amount of data bandwidth utilized in the selected period up to the time of the prediction.

11. The system of claim 7, wherein the processor is further configured to determine that decreasing streaming media bandwidth utilization will decrease total bandwidth utilization.

12. A system for controlling bandwidth utilization, comprising:
  a processor configured to
  (a) predict that a bandwidth utilization threshold will likely be one of met and exceeded by a first user;
  (b) in response, select a lower quality codec to be used by selected communications of the first user; and
  (c) thereafter apply the lower quality codec to the selected communications, wherein the processor predicts that the bandwidth utilization threshold is likely one of met and exceeded by a first user by determining that a historic bandwidth usage exceeds the bandwidth utilization threshold, wherein historic bandwidth usage comprises at least one of total bandwidth utilization, voice bandwidth utilization, and non-voice bandwidth utilization, and wherein the server is further configured to identify a line of best fit for at least one of the previous total bandwidth utilization, previous voice bandwidth utilization, and previous non-voice bandwidth utilization, determine a gradient for the identified line of best fit, and compare at least one of:
    (i) the gradient of the previous total bandwidth utilization and the gradient of the previous voice bandwidth utilization;
    (ii) the gradient of the previous total bandwidth utilization and the gradient of the previous non-voice bandwidth utilization; and
    (iii) the gradient of the previous voice bandwidth utilization and the gradient of the previous non-voice bandwidth utilization.

13. A system for controlling bandwidth utilization, comprising:
  a processor configured to
  (a) predict that a bandwidth utilization threshold will likely be one of met and exceeded by a first user;
  (b) in response, select a lower quality codec to be used by selected communications of the first user; and
  (c) thereafter apply the lower quality codec to the selected communications, wherein the processor is further configured to obtain an amount of historic bandwidth usage from an Internet service provider (ISP), monitor streaming media bandwidth utilization, and store the monitored streaming media bandwidth utilization and obtained historic bandwidth usage.

14. A method of controlling bandwidth utilization, comprising:
  determining that at least one of (i) a historic bandwidth usage in a selected period, (ii) a projected bandwidth in a selected time period, and (iii) a degree of network congestion over a selected link is below a selected threshold; and
  in response to determining that at least one of (i), (ii), and (iii) is true, increasing bandwidth utilization for a particular type of bandwidth.

15. The method of claim 14, wherein the type of bandwidth comprises at least one of streaming media bandwidth and data transfer bandwidth, wherein increasing streaming media bandwidth utilization comprises switching from a first type of codec that utilizes a first amount of bandwidth per packet to a second type of codec that utilizes a second amount of bandwidth per packet, wherein the second amount of bandwidth per packet is greater than the first amount of bandwidth per packet.

16. The method of claim 14, wherein the historical bandwidth usage in the selected period comprises at least one of (i) the amount of total bandwidth utilized in the selected period up to a time of the prediction and (ii) the amount of voice bandwidth utilized and the amount of data bandwidth utilized in the selected period up to a time of the prediction.

17. A method of controlling bandwidth utilization, comprising:
  predicting, by a processor, that a bandwidth utilization threshold will likely be one of met and exceeded by a first user;
  in response, reducing, by the processor, a signal quality to reduce a likely bandwidth usage by the first user, wherein historic bandwidth usage comprises at least one of total bandwidth utilization, voice bandwidth utilization, and non-voice bandwidth utilization;
  identifying a line of best fit for at least one of the previous total bandwidth utilization, previous voice bandwidth utilization, and previous non-voice bandwidth utilization;
  determining a gradient for the identified line of best fit; and
  comparing at least one of:
    (i) the gradient of a previous total bandwidth utilization and the gradient of the previous voice bandwidth utilization;
    (ii) the gradient of a previous total bandwidth utilization and the gradient of the previous non-voice bandwidth utilization; and
    (iii) the gradient of a previous voice bandwidth utilization and the gradient of the previous non-voice bandwidth utilization.

18. A method of controlling bandwidth utilization, comprising:
  predicting, by a processor, that a bandwidth utilization threshold will likely be one of met and exceeded by a first user;
  in response, reducing, by the processor, a signal quality to reduce a likely bandwidth usage by the first user;
  obtaining historic bandwidth usage from an Internet service provider (ISP);
  monitoring streaming media bandwidth utilization; and
  storing the monitored streaming media bandwidth utilization and obtained historic bandwidth usage.

19. A non-transitory computer readable medium comprising processor executable instructions to perform the method of claim 18.

* * * * *

UNITED STATES PATENT AND TRADEMARK OFFICE
CERTIFICATE OF CORRECTION

| | | |
|---|---|---|
| PATENT NO. | : 7,873,074 B1 | Page 1 of 1 |
| APPLICATION NO. | : 11/446061 | |
| DATED | : January 18, 2011 | |
| INVENTOR(S) | : Simon Boland | |

It is certified that error appears in the above-identified patent and that said Letters Patent is hereby corrected as shown below:

At column 20, line 45, after "selected" insert --billing--.

Signed and Sealed this
Nineteenth Day of April, 2011

David J. Kappos
*Director of the United States Patent and Trademark Office*